United States Patent
Shinto (10) Patent No.: US 9,721,405 B1
(45) Date of Patent: Aug. 1, 2017

(54) SECURE ID BADGE SYSTEM

(71) Applicant: International Business Machines Corporation, Armonk, NY (US)

(72) Inventor: Kentaro Shinto, Kashiwa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/060,653

(22) Filed: Mar. 4, 2016

(51) Int. Cl.
  G06K 5/00 (2006.01)
  G07C 9/00 (2006.01)
  G06K 19/077 (2006.01)
  G06K 7/00 (2006.01)

(52) U.S. Cl.
  CPC ....... G07C 9/00015 (2013.01); G06K 7/0021 (2013.01); G06K 19/07707 (2013.01)

(58) Field of Classification Search
  CPC G06K 5/00; G06K 19/00; G06K 7/01; G06K 7/10; G06F 17/00; G06F 7/00; G06Q 40/00
  USPC .... 235/382, 375, 487, 382.5, 376, 377, 380; 705/44
  See application file for complete search history.

(56) References Cited

U.S. PATENT DOCUMENTS

| | | |
|---|---|---|
| 7,270,276 B2 | 9/2007 | Vayssiere |
| 7,874,488 B2 | 1/2011 | Parkinson |
| 8,783,578 B2 | 7/2014 | Kim |
| 2001/0015788 A1* | 8/2001 | Mandai ................ G02F 1/1345 349/172 |
| 2002/0120862 A1* | 8/2002 | Proudler ................ G06F 21/57 726/26 |
| 2003/0189093 A1* | 10/2003 | Fujimoto ........... G07C 9/00015 235/382 |
| 2005/0091338 A1* | 4/2005 | de la Huerga ........ A61J 1/1437 709/217 |
| 2005/0211767 A1* | 9/2005 | Sawachi ............. G06K 19/077 235/380 |
| 2007/0067642 A1* | 3/2007 | Singhal .................. G06F 21/32 713/186 |
| 2009/0058594 A1* | 3/2009 | Nakagawa ........... G06Q 10/063 340/5.7 |
| 2009/0174633 A1* | 7/2009 | Kumhyr ................ G09F 3/0294 345/82 |
| 2014/0279516 A1* | 9/2014 | Rellas ................ G06Q 30/0185 705/44 |
| 2016/0071052 A1* | 3/2016 | Henry .................. G06Q 10/087 235/380 |

* cited by examiner

Primary Examiner — Edwyn Labaze
(74) Attorney, Agent, or Firm — Edward P. Li (57) ABSTRACT

A method, a computer program product, and a computer system for displaying and erasing an ID badge image on an ID badge. An entry terminal device of a target area receives from an ID badge a transmission of an ID number and confirms the ID numbers. In response to determining that the ID number is confirmed, the entry terminal device obtains an ID badge image for the ID number. The entry terminal device transmits the ID badge image to the ID badge, wherein the ID badge image is displayed on the ID badge when the ID badge is carried into the target area. An exit terminal device of the target area transmits an instruction of erasing a display of the ID badge image on the ID badge, wherein the ID badge image is erased from the ID badge when the ID badge is carried out of the target area.

18 Claims, 7 Drawing Sheets

SECURE ID BADGE SYSTEM

BACKGROUND

The present invention relates generally to a secure ID badge system, and more particularly to changing display states on an ID badge responding to events of entering and exiting a facility.

An ID badge or an entrance card needs to be always carried and/or worn so as to allow a person to enter and stay in a target area, such as a building and an office. The ID badge or entrance card recognizes that the person is authorized to enter and stay in the target area. Meanwhile, the following risks may arise when ID badge or the entrance card remains to be worn outside of the target area. (1) The identities of the person and the organization are unnecessarily disclosed. (2) When the ID badge or entrance card is lost, any malicious third party may identify the target area and succeed in entering the area. (3) It is inconvenient to carry and manage multiple entrance cards for multiple target areas.

SUMMARY

In one aspect, a method for displaying and erasing an ID badge image on an ID badge is provided. The method includes an entry terminal device of a target area receiving a transmission of an ID number from an ID badge. The method further includes the entry terminal device confirming the ID number. The method further includes, in response to determining that the ID number is confirmed, the entry terminal device obtaining from a system storing ID badge images an ID badge image for the ID number. The method further includes the entry terminal device transmitting the ID badge image to the ID badge, wherein the ID badge image is displayed on the ID badge when the ID badge is carried into the target area. The method further includes an exit terminal device of the target area transmitting to the ID badge an instruction of erasing a display of the ID badge image on the ID badge, wherein the ID badge image is erased from the ID badge when the ID badge is carried out of the target area.

In another aspect, a computer program product for displaying and erasing an ID badge image on an ID badge is provided. The computer program product comprises a computer readable storage medium having program code embodied therewith. The program code is executable to implement as follows. An entry terminal device of a target area receives from an ID badge a transmission of an ID number. The entry terminal device confirms the ID number. In response to determining that the ID number is confirmed, the entry terminal device obtains, from a system storing ID badge images, an ID badge image for the ID number. The entry terminal device transmits the ID badge image to the ID badge, wherein the ID badge image is displayed on the ID badge when the ID badge is carried into the target area. An exit terminal device of the target area transmits to the ID badge an instruction of erasing a display of the ID badge image on the ID badge, wherein the ID badge image is erased from the ID badge when the ID badge is carried out of the target area.

In yet another aspect, a computer system for displaying and erasing an ID badge image on an ID badge is provided. The computer system comprises one or more processors, one or more computer readable tangible storage devices, and program instructions stored on at least one of the one or more computer readable tangible storage devices for execution by at least one of the one or more processors. The program instructions are executable to receive from an ID badge, by an entry terminal device of a target area, a transmission of an ID number. The program instructions are executable to confirm, by the entry terminal device, the ID number. The program instructions are executable to obtain from a system storing ID badge images, by the entry terminal device, an ID badge image for the ID number, in response to determining that the ID number is confirmed. The program instructions are executable to transmit, by the entry terminal device, the ID badge image to the ID badge, wherein the ID badge image is displayed on the ID badge when the ID badge is carried into the target area. The program instructions are executable to transmit to the ID badge, by an exit terminal device of the target area, an instruction of erasing a display of the ID badge image on the ID badge, wherein the ID badge image is erased from the ID badge when the ID badge is carried out of the target area.

DETAILED DESCRIPTION

Figure 1:
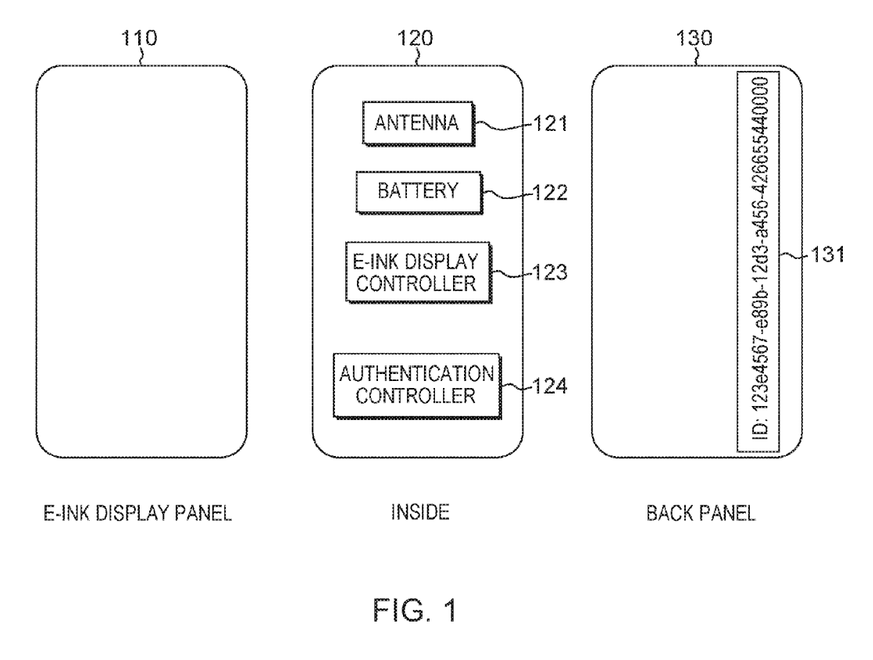
FIG. 1 is a diagram illustrating structure of an ID badge, in accordance with one embodiment of the present invention.

FIG. 1 is a diagram illustrating structure of an ID badge, in accordance with one embodiment of the present invention. The ID badge comprises E-ink display panel 110. E-ink display panel 110 displays an ID badge image when the ID badge receives an instruction from an entry terminal device of a target area (such as a building and an office), and E-ink display panel 110 erases an ID badge image when the ID badge receives an instruction from an exit terminal device of the target area. In other embodiments, the ID badge may be configured to automatically erase an ID badge image after the lapse of a predetermined period of time. E-ink display panel 110 has a feature of the low power consumption. The ID badge further comprises back panel 130 includes ID number 131, for example a universally unique identifier (UUID) which is a 128-bit value. One or more additional ID numbers may be added on the ID badge for multiple target areas. Any ID number may be removed from the ID badge.

Inside 120 of the ID badge comprises antenna 121, battery 122, E-ink display controller 123, and authentication controller 124. Antenna 121 is for communications between the ID badge and the entry or exit terminal device, and it is also for contactless power transmission. E-ink display controller 123 controls a display of an ID badge image when receiving an instruction from an entry terminal device of a target area (such as a building and an office), and it controls erasure of a display of an ID badge image when receiving an instruction from an exit terminal device of the target area. Authentication controller 124 communicates with the entry or exit terminal device for confirming ID number 131 and/or an additional security mechanism. Battery 122 provides power for the operations of antenna 121, E-ink display controller 123, authentication controller 124, as well as displaying the ID badge image in the ID badge.

The ID badge does not have any prescribed data for providing the display. Accordingly, it is not possible for any unauthorized third party to view the content of the display on the ID badge.

Figure 2:
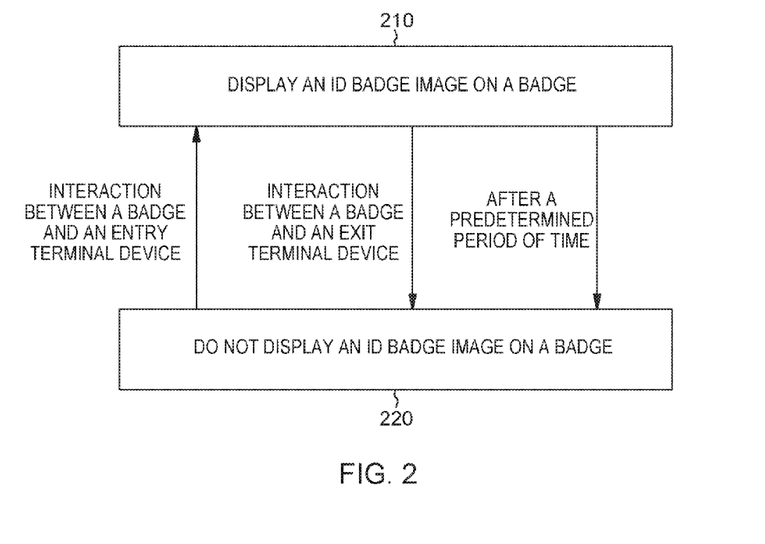
FIG. 2 is a diagram illustrating states of displaying and erasing an ID badge image on an ID badge, in accordance with one embodiment of the present invention.

FIG. 2 is a diagram illustrating states of displaying and erasing an ID badge image on an ID badge, in accordance with one embodiment of the present invention. The ID badge can be switched between two states (denoted by numerals 210 and 220): display an ID badge image (210) and do not display an ID badge image (220). To display the ID badge image on an ID badge is performed at the time of entry to a target area (such as a building and an office). The interaction between an ID badge and an entry terminal device of the target area switches from state 220 (do not display an ID badge image) to state 210 (display the ID badge image). The interaction between an ID badge and an exit terminal device of the target area switches from state 210 (display the ID badge image) to state 220 (do not display an ID badge image). In some embodiments, after the lapse of a predetermined period of time, an ID badge switches from state 210 (display the ID badge image) to state 220 (do not display an ID badge image).

Figure 3:
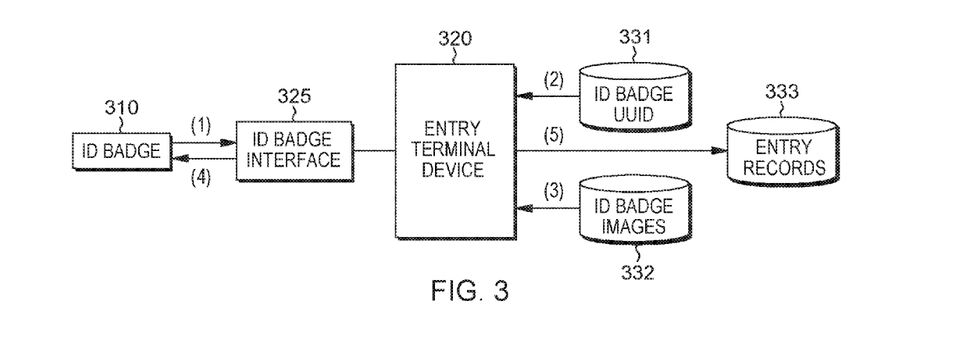
FIG. 3 is a diagram illustrating interactions between an ID badge and components of an entry terminal of a target area, in accordance with one embodiment of the present invention.

FIG. 3 is a diagram illustrating interactions between an ID badge and components of an entry terminal of a target area, in accordance with one embodiment of the present invention. At the entry terminal, entry terminal device 320 controls displaying an ID badge image on ID badge 310. Entry terminal device 320 includes ID badge interface 325. ID badge interface 325 is capable of near field radio communications and contactless power transmission with ID badge 310. Entry terminal device 320 is capable of accessing retrieval servers. These servers includes server 331 for storing ID badge universally unique identifier (UUID), server 332 for storing ID badge images, and server 333 for storing entry records.

Figure 4:
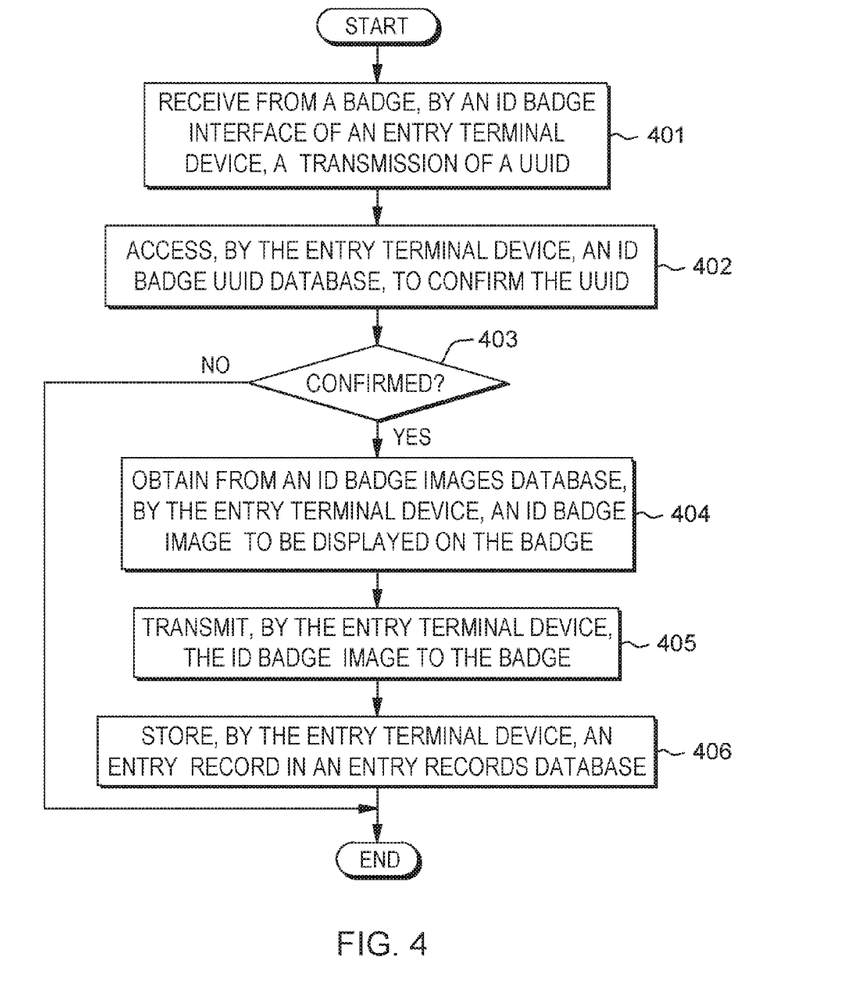
FIG. 4 is a flowchart illustrating operational steps at an entry terminal of a target area, in accordance with one embodiment of the present invention.

FIG. 4 is a flowchart illustrating operational steps at an entry terminal, in accordance with one embodiment of the present invention. The operational steps are implemented by one or more computer programs in entry terminal device 320 (shown in FIG. 3). At step 401, ID badge interface 325 (shown in FIG. 3) of entry terminal device 320 receives from ID badge 310 (shown in FIG. 3) a transmission of ID number 131 (shown in FIG. 1). In FIG. 3, this step is denoted by arrow (1). In an embodiment, ID number 131 is a universally unique identifier (UUID) which is a 128-bit value. At step 402, entry terminal device 320 accesses a database storing ID numbers, such as server 331 for storing ID badge universally unique identifier (UUID), to confirm ID number 131. Through the confirmation, entry terminal device 320 determines whether the entry permission can be given to the ID number. Entry terminal device 320 obtains the confirmation from server 331, which is denoted by arrow (2) in FIG. 3. At decision block 403, entry terminal device 320 determines whether ID number 131 is confirmed.

In response to determining that ID number 131 is not confirmed (NO branch of decision block 403), entry terminal device 320 denies the entry permission for the ID number; therefore, entry terminal device 320 terminates the following steps. In response to determining that ID number 131 is confirmed (YES branch of decision block 403), entry terminal device 320 at step 404 obtains, from server 332 for storing ID badge images, an ID badge image to be displayed on ID badge 310. In FIG. 3, obtaining the ID badge image is denoted by arrow (3).

At step 405, entry terminal device 320 transmits the ID badge image to ID badge 310. In FIG. 3, the transmission of the ID badge image to ID badge 310 is denoted by arrow (4). At step 406, entry terminal device 320 stores an entry record of ID badge 310 on server 333 for storing entry records. In FIG. 3, storing the entry record is denoted by arrow (5).

Figure 5:
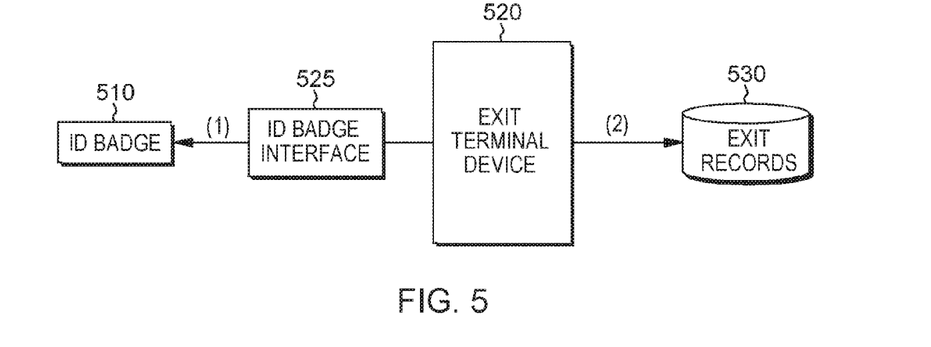
FIG. 5 is a diagram illustrating interactions between an ID badge and components of an exit terminal of a target area, in accordance with one embodiment of the present invention.

FIG. 5 is a diagram illustrating interactions between an ID badge and components of an exit terminal of a target area, in accordance with one embodiment of the present invention. At the exit terminal, exit terminal device 520 controls erasing an ID badge image on ID badge 510. Exit terminal device 520 includes ID badge interface 525. ID badge interface 525 is capable of near field radio communications and contactless power transmission with ID badge 510. Exit terminal device 520 is capable of accessing server 530 for storing exit records.

Figure 6:
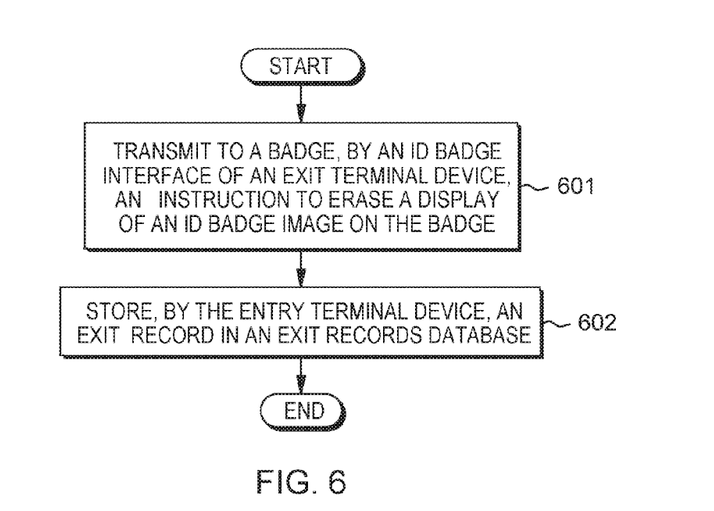
FIG. 6 is a flowchart illustrating operational steps at an exit terminal of a target area, in accordance with one embodiment of the present invention.

FIG. 6 is a flowchart illustrating operational steps at an exit terminal, in accordance with one embodiment of the present invention. The operational steps are implemented by one or more computer programs in exit terminal device 520 (shown in FIG. 5). At step 601, ID badge interface 525 (shown in FIG. 5) of exit terminal device 520 transmits to ID badge 510 an instruction to erase a display of an ID badge image on ID badge 510. Transmitting the instruction from ID badge interface 525 to ID badge 510 is denoted by arrow (1) in FIG. 5. At step 602, exit terminal device 520 stores an exit record on server 530 for storing exit records. In FIG. 5, storing the exit record is denoted by arrow (2).

Figure 7:
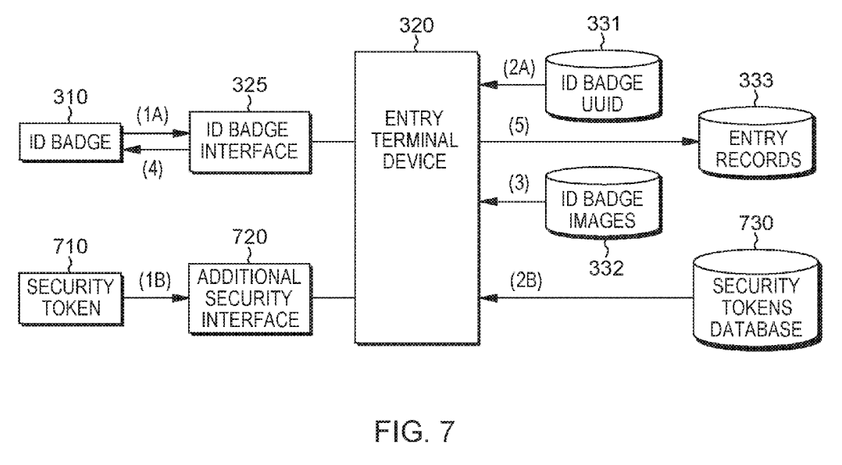
FIG. 7 is a diagram illustrating interactions between an ID badge and components of an entry terminal with an additional authentication mechanism, in accordance with one embodiment of the present invention.

FIG. 7 is a diagram illustrating interactions between an ID badge and components of an entry terminal with an additional authentication mechanism, in accordance with one embodiment of the present invention. Same as the system shown in FIG. 3, entry terminal device 320 in the system shown in FIG. 7 controls displaying an ID badge image on ID badge 310. Also same as the system shown in FIG. 3, entry terminal device 320 in the system shown in FIG. 7 includes ID badge interface 325 which is capable of near field radio communications and contactless power transmission with ID badge 310. Furthermore, same as the system shown in FIG. 3, entry terminal device 320 in the system shown in FIG. 7 is capable of accessing retrieval servers including server 331 for storing ID badge universally unique identifier (UUID), server 332 for storing ID badge images, and server 333 for storing entry records. In FIG. 7, the components same as those shown in FIG. 3 provide a first authentication mechanism. In addition to the components in the system shown in FIG. 3, an additional security feature is incorporated into the system shown in FIG. 7. In the system shown in FIG. 7, entry terminal device 320 further includes a second authentication mechanism. Permission to enter a target area is given only when ID badge 310 is authenticated by both the first and second authentication mechanisms.

In the system shown in FIG. 7, the second authentication mechanism is implemented by additional security interface 720, security token 710, and security token database 730. For example, the second authentication mechanism confirms whether near field communication (NFC) of a smart phone, a media access control (MAC) address of a Bluetooth device, a smart phone screen, or a Quick Response (QR) code is registered. In other embodiment, a keypad can be used as additional security interface 720 to receive a passcode.

Figure 8:
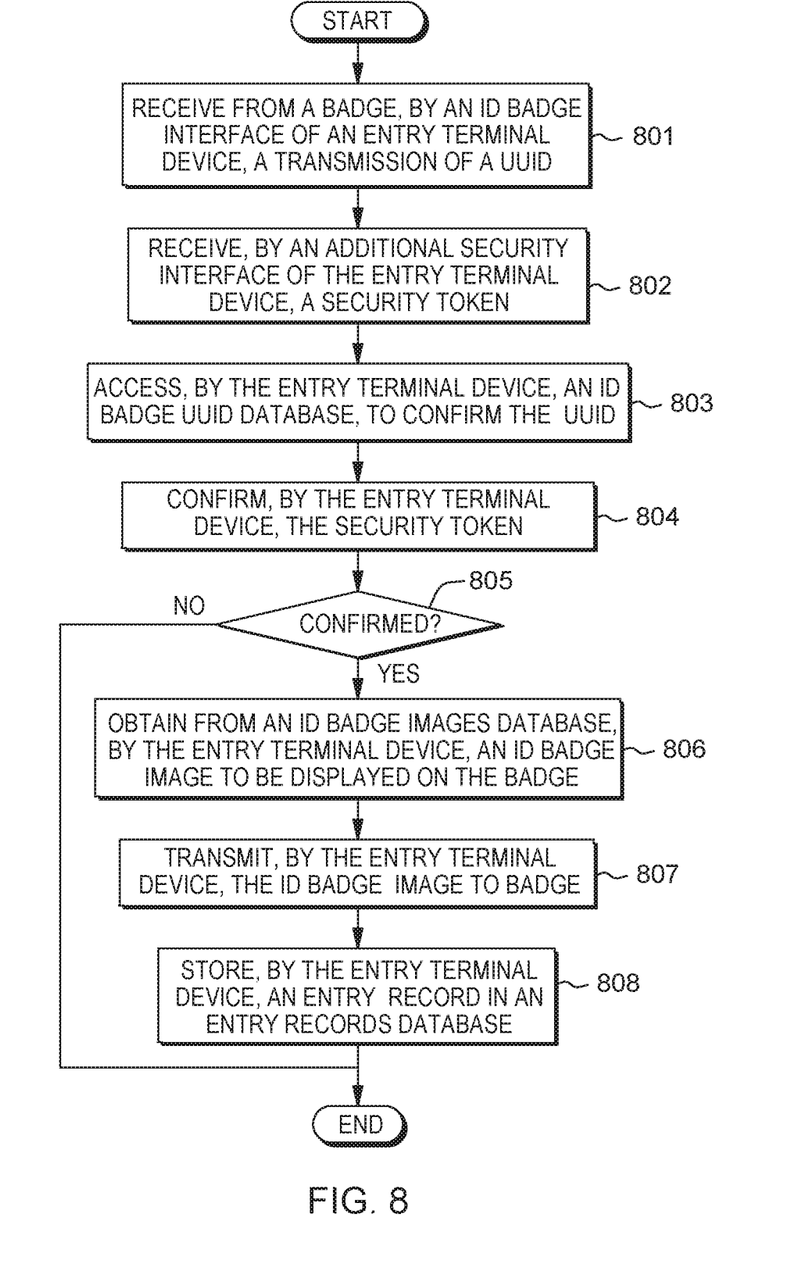
FIG. 8 is a flowchart illustrating operational steps at an entry terminal with an additional authentication mechanism, in accordance with one embodiment of the present invention.

FIG. 8 is a flowchart illustrating operational steps at an entry terminal with an additional authentication mechanism, in accordance with one embodiment of the present invention. The operational steps are implemented by one or more computer programs in entry terminal device 320 shown in FIG. 7. At step 801, ID badge interface 325 (shown in FIG. 7) of entry terminal device 320 receives from ID badge 310 (shown in FIG. 7) a transmission of ID number 131 (shown in FIG. 1). In FIG. 7, this step is denoted by arrow (1A). In an embodiment, ID number 131 is a universally unique identifier (UUID) which is a 128-bit value. At step 802, additional security interface 720 (shown in FIG. 7) receives security token 710 shown in FIG. 7. Security token 710 may be, for example, registered NFC of a smart phone, a registered MAC address of a Bluetooth device, a registered smart phone screen, a registered QR code, or registered pass code. In FIG. 7, this step is denoted by arrow (1B).

At step 803, entry terminal device 320 accesses a database storing ID numbers, such as server 331 for storing ID badge universally unique identifier (UUID), to confirm ID number 131 shown in FIG. 7. Through the confirmation, entry terminal device 320 determines whether the entry permission can be given to the ID number. Entry terminal device 320 obtains the confirmation from server 331, which is denoted by arrow (2A) in FIG. 7. At step 804, entry terminal device 320 confirms security token 710, by accessing security tokens database 730 shown in FIG. 7. Entry terminal device 320 obtains the confirmation from security tokens database 730, which is denoted by arrow (2B) in FIG. 7.

At decision block 805, entry terminal device 320 determines whether ID number 131 and security token 710 are confirmed. In response to determining that ID number 131 and security token 710 are not confirmed (NO branch of decision block 805), entry terminal device 320 denies the entry permission for the ID number; therefore, entry terminal device 320 terminates the following steps. In response to determining that ID number 131 and security token 710 are confirmed (YES branch of decision block 805), entry terminal device 320 at step 806 obtains, from server 332 for storing ID badge images, an ID badge image to be displayed on ID badge 310. In FIG. 7, obtaining the ID badge image is denoted by arrow (3).

At step 807, entry terminal device 320 transmits the ID badge image to ID badge 310. In FIG. 7, the transmission of the ID badge image to ID badge 310 is denoted by arrow (4). At step 808, entry terminal device 320 stores an entry record of ID badge 310 on server 333 for storing entry records. In FIG. 7, storing the entry record is denoted by arrow (5).

Figure 9:
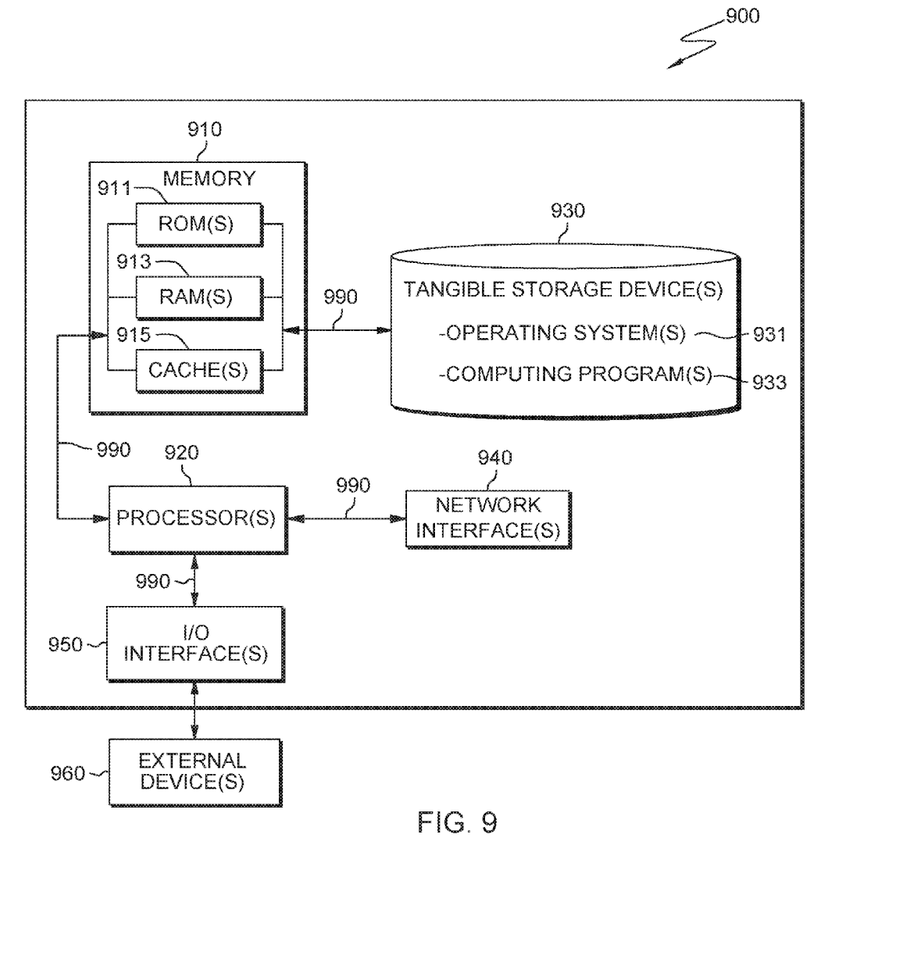
FIG. 9 is a diagram illustrating components of a computer device hosting one or more computer programs for displaying an ID badge image or a computer device hosting one or more computer programs for erasing an ID badge image, in accordance with one embodiment of the present invention.

FIG. 9 is a diagram illustrating components of a computer device hosting one or more computer programs for displaying an ID badge image or a computer device hosting one or more computer programs for erasing an ID badge image, in accordance with one embodiment of the present invention. It should be appreciated that FIG. 9 provides only an illustration of one implementation and does not imply any limitations with regard to the environment in which different embodiments may be implemented.

Referring to FIG. 9, computer device 900 includes processor(s) 920, memory 910, and tangible storage device(s) 930. In FIG. 9, communications among the above-mentioned components of computer device 900 are denoted by numeral 990. Memory 910 includes ROM(s) (Read Only Memory) 911, RAM(s) (Random Access Memory) 913, and cache(s) 915. One or more operating systems 931 and one or more computer programs 933 reside on one or more computer readable tangible storage device(s) 930. One or more computer programs 933 include one or more computer programs for displaying an ID badge image and/or for erasing an ID badge image. Computer device 900 further includes I/O interface(s) 950. I/O interface(s) 950 allows for input and output of data with external device(s) 960 that may be connected to computer device 900. Computer device 900 further includes network interface(s) 940 for communications between computer device 900 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the FIGs illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for displaying and erasing an ID badge image on an ID badge, the method comprising:
    receiving, by an entry terminal device of a target area, a transmission of an ID number, from an antenna of an ID badge;
    confirming, by the entry terminal device, the ID number;
    obtaining, by the entry terminal device, an ID badge image for the ID number, from a system storing ID badge images, in response to determining that the ID number is confirmed;
    transmitting, by the entry terminal device, the ID badge image to the ID badge, by near field radio communication and contactless power transmission, the ID badge image being displayed on the ID badge when the ID badge is carried into the target area; and
    transmitting to the ID badge, by an exit terminal device of the target area, an instruction of erasing a display of the ID badge image on the ID badge, by the near field radio communication and the contactless power transmission, the ID badge image being erased from the ID badge when the ID badge is carried out of the target area.

2. The method of claim 1, further comprising:
    storing, by the entry terminal device, an entry record of the ID number, in a system storing entry records.

3. The method of claim 1, further comprising:
    storing, by the exit terminal device, an exit record of the ID number, in a system storing exit records.

4. The method of claim 1, further comprising:
    receiving, by the entry terminal device, a security token; and
    confirming, by the entry terminal device, the security token.

5. The method of claim 1, further comprising:
    configuring, by the entry terminal device, the ID badge such that the ID badge image is erased after a predetermined period of time.

6. The method of claim 1, wherein the ID number is a universally unique identifier.

7. A computer program product for displaying and erasing an ID badge image on an ID badge, the computer program product comprising a computer readable storage medium having program code embodied therewith, the program code executable to:
    receive, by an entry terminal device of a target area, a transmission of an ID number, from an antenna of an ID badge;
    confirm, by the entry terminal device, the ID number;

obtain, by the entry terminal device, an ID badge image for the ID number, from a system storing ID badge images, in response to determining that the ID number is confirmed;

transmit, by the entry terminal device, the ID badge image to the ID badge, by near field radio communication and contactless power transmission, the ID badge image being displayed on the ID badge when the ID badge is carried into the target area; and transmit to the ID badge, by an exit terminal device of the target area, an instruction of erasing a display of the ID badge image on the ID badge, by the near field radio communication and the contactless power transmission, the ID badge image being erased from the ID badge when the ID badge is carried out of the target area.

8. The computer program product of claim 7, further comprising the program code executable to:
store, by the entry terminal device, an entry record of the ID number, in a system storing entry records.

9. The computer program product of claim 7, further comprising the program code executable to:
store, by the exit terminal device, an exit record of the ID number, in a system storing exit records.

10. The computer program product of claim 7, further comprising the program code executable to:
receive, by the entry terminal device, a security token; and
confirm, by the entry terminal device, the security token.

11. The computer program product of claim 7, further comprising the program code executable to:
configure, by the entry terminal device, the ID badge such that the ID badge image is erased after a predetermined period of time.

12. The computer program product of claim 7, wherein the ID number is a universally unique identifier.

13. A computer system for displaying and erasing an ID badge image on an ID badge, the computer system comprising:
one or more processors, one or more computer readable tangible storage devices, and program instructions stored on at least one of the one or more computer readable tangible storage devices for execution by at least one of the one or more processors, the program instructions executable to:
receive, by an entry terminal device of a target area, a transmission of an ID number, from an antenna of an ID badge;
confirm, by the entry terminal device, the ID number;
obtain, by the entry terminal device, an ID badge image for the ID number, from a system storing ID badge images, in response to determining that the ID number is confirmed;
transmit, by the entry terminal device, the ID badge image to the ID badge, by near field radio communication and contactless power transmission, the ID badge image being displayed on the ID badge when the ID badge is carried into the target area; and
transmit to the ID badge, by an exit terminal device of the target area, an instruction of erasing a display of the ID badge image on the ID badge, by the near field radio communication and the contactless power transmission, the ID badge image being erased from the ID badge when the ID badge is carried out of the target area.

14. The computer system of claim 13, further comprising the program instructions executable to:
store, by the entry terminal device, an entry record of the ID number, in a system storing entry records.

15. The computer system of claim 13, further comprising the program instructions executable to:
store, by the exit terminal device, an exit record of the ID number, in a system storing exit records.

16. The computer system of claim 13, further comprising the program instructions executable to:
receive, by the entry terminal device, a security token; and
confirm, by the entry terminal device, the security token.

17. The computer system of claim 13, further comprising the program instructions executable to:
configure, by the entry terminal device, the ID badge such that the ID badge image is erased after a predetermined period of time.

18. The computer system of claim 13, wherein the ID number is a universally unique identifier.

* * * * *